United States Patent
Förtsch et al.

(10) Patent No.: US 10,538,453 B2
(45) Date of Patent: Jan. 21, 2020

(54) METHOD FOR CUTTING GLASS USING A LASER, AND GLASS PRODUCED ACCORDING TO THE METHOD

(71) Applicant: Schott AG, Mainz (DE)

(72) Inventors: Dirk Förtsch, Waldalgesheim (DE); Stephan Behle, Gau-Odernheim (DE); Peter Thomas, Koblenz (DE)

(73) Assignee: Schott AG, Mainz (DE)

(*) Notice: Subject to any disclaimer, the term of this patent is extended or adjusted under 35 U.S.C. 154(b) by 99 days.

(21) Appl. No.: 15/674,124

(22) Filed: Aug. 10, 2017

(65) Prior Publication Data

US 2018/0022631 A1 Jan. 25, 2018

Related U.S. Application Data

(63) Continuation of application No. PCT/EP2016/056613, filed on Mar. 24, 2016.

(30) Foreign Application Priority Data

Mar. 27, 2015 (DE) ........................ 10 2015 104 802

(51) Int. Cl.
*C03B 33/02* (2006.01)
*C03B 33/09* (2006.01)
(Continued)

(52) U.S. Cl.
CPC .......... *C03B 33/091* (2013.01); *B65G 49/065* (2013.01); *C03B 33/0235* (2013.01); (Continued)

(58) Field of Classification Search
CPC .............................. C03B 33/00; C03B 33/0222
See application file for complete search history.

(56) References Cited

U.S. PATENT DOCUMENTS 5,984,159 A * 11/1999 Ostendarp ............ B23K 26/073
225/93.5
6,252,197 B1 * 6/2001 Hoekstra ............ B23K 26/0604
219/121.84
(Continued)

FOREIGN PATENT DOCUMENTS

CA 2 602 997 A1 3/2008
DE 197 15 537 A1 10/1997
(Continued)

OTHER PUBLICATIONS

Machine Translation of WO 02/48059 (Year: 2002).*
(Continued)

*Primary Examiner* — Cynthia Szewczyk
(74) *Attorney, Agent, or Firm* — Taylor IP, P.C.

(57) ABSTRACT

A method for cutting thin glass, wherein the thin glass is heated with a laser beam along a path forming a cutting line moving along a forward feed direction, such that a crack propagates along the cutting line and cuts through the thin glass. The laser beam is formed by a beam-forming optic in such a way that the beam profile thereof has an elongated shape. The laser beam is orientated on the surface of the thin glass such that the longitudinal direction thereof is aligned in the feed direction. The elongated shape of the beam profile is asymmetric, such that the intensity course differs at the ends of the beam profile in such a way that the increase in intensity at the front end crossing the thin glass first is steeper than the drop in intensity at the opposite rear end.

9 Claims, 8 Drawing Sheets

(51) Int. Cl.
    *C03B 33/023*     (2006.01)
    *B65G 49/06*     (2006.01)
    *C03B 33/03*     (2006.01)
    *C03C 3/091*     (2006.01)
    *C03C 3/064*     (2006.01)
    *C03C 3/066*     (2006.01)
    *C03C 3/089*     (2006.01)
    *C03C 3/093*     (2006.01)

(52) U.S. Cl.
    CPC .............. *C03B 33/03* (2013.01); *C03C 3/064* (2013.01); *C03C 3/066* (2013.01); *C03C 3/089* (2013.01); *C03C 3/091* (2013.01); *C03C 3/093* (2013.01)

(56) References Cited

U.S. PATENT DOCUMENTS

| | | |
|---|---|---|
| 6,327,875 B1 | 12/2001 | Allaire et al. |
| 2002/0032117 A1 | 3/2002 | Peuchert et al. |
| 2003/0145624 A1 | 8/2003 | Luettgens et al. |
| 2005/0109953 A1* | 5/2005 | Otsu .................. B23K 26/0604 250/492.1 |
| 2007/0284785 A1 | 12/2007 | Hoekstra |
| 2010/0243628 A1* | 9/2010 | Lee ....................... C03B 33/091 219/121.72 |
| 2011/0084426 A1 | 4/2011 | Nakamura et al. |
| 2012/0000894 A1 | 1/2012 | Abramov et al. |
| 2012/0135195 A1 | 5/2012 | Glaesemann et al. |
| 2013/0126576 A1 | 5/2013 | Marshall et al. |
| 2013/0207058 A1 | 8/2013 | Wegener et al. |
| 2013/0224433 A1 | 8/2013 | Matsumoto et al. |
| 2013/0323469 A1 | 12/2013 | Abramov et al. |
| 2014/0113797 A1 | 4/2014 | Yamada et al. |
| 2014/0199519 A1 | 7/2014 | Schillinger et al. |
| 2015/0059411 A1 | 3/2015 | Lim et al. |

FOREIGN PATENT DOCUMENTS

| | | |
|---|---|---|
| DE | 198 56 347 A1 | 3/2000 |
| DE | 10 2014 113 149 A1 | 3/2016 |
| WO | 02/48059 A1 | 6/2002 |
| WO | 03/013816 A1 | 2/2003 |
| WO | 2011/026074 A1 | 3/2011 |
| WO | 2015/044430 A1 | 4/2015 |

OTHER PUBLICATIONS

International Search Report dated Jun. 16, 2016 for International Application No. PCT/EP2016/056613 (6 pages).
Notice of Transmission of the International Research Report and the Written Notice Issued the International Searching Authority or Declaration dated Jun. 16, 2016 for International Patent Application No. PCT/EP2016/056613 (19 pages).

* cited by examiner

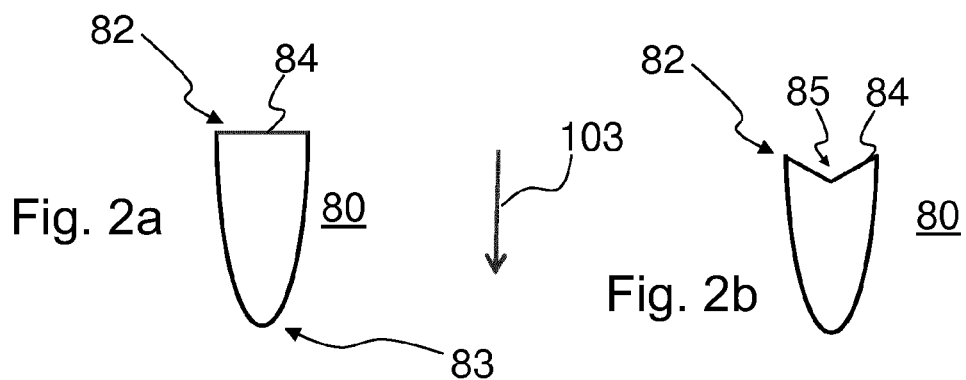
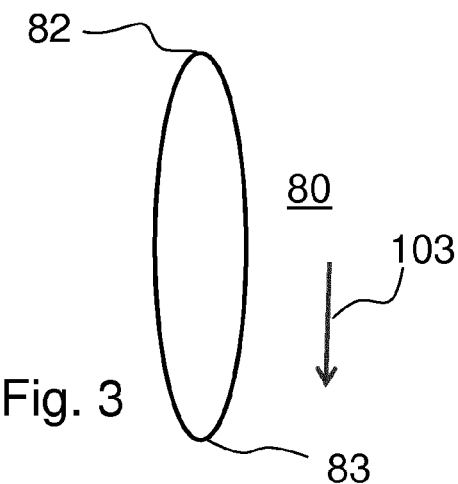
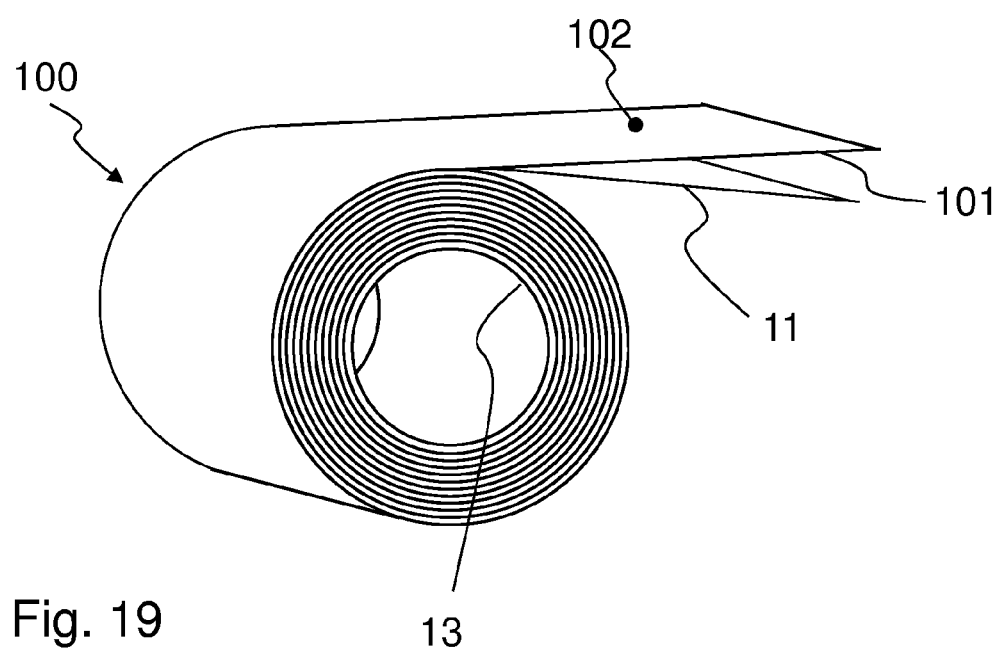

METHOD FOR CUTTING GLASS USING A LASER, AND GLASS PRODUCED ACCORDING TO THE METHOD

CROSS REFERENCE TO RELATED APPLICATIONS

This is a continuation of PCT application No. PCT/EP2016/056613, entitled "METHOD FOR CUTTING GLASS BY MEANS OF A LASER, AND GLASS PRODUCED ACCORDING TO SAID METHOD", filed Mar. 24, 2016, which is incorporated herein by reference.

BACKGROUND OF THE INVENTION

1. Field of the Invention

The present invention relates to cutting of glass, and, more particularly to cutting of glass by way of laser-induced stress crack separation.

2. Description of the Related Art

A common method for separating glass is the crack separation. In this process, a linear failure zone is typically introduced into the glass by a scoring wheel. By applying mechanical stress, the glass can then be easily separated along this failure zone. However, one disadvantage herein is that the edge of a thus obtained glass element may be damaged due to the previously created failure zone. Since the edges are especially critical in regard to mechanical stress of the glass under tensile stress, separation of a glass by way of scoring and breaking can lead to a clear reduction of strength, in particular in the case of a bending load.

Flat glasses, especially thin and very thin glasses having thicknesses of less than 1.2 mm, for example less than 200 microns, are currently often produced in the form of long ribbons. Based on the manufacturing process, for example when re-drawing a glass ribbon from a pre-form, or when drawing from a melt, thickened edge regions—so-called braids—typically form along the edge of the glass ribbon. It may be desirable to remove these braids after production of the glass ribbon; in the case of thin glasses—among other things—to facilitate winding onto a roll or in general to facilitate further processing. As a result, problems can be avoided such as, for example the creation of greater mechanical stresses that are caused by the thicker braids, and that in turn result in increased twisting or warping of the thin glass.

A device and a method for continuous edge separation from a thin glass ribbon are known from US 2013/0126576 A1. With this device, initial flaws are imposed into the glass ribbon by means of a scoring device. While the glass ribbon is guided in its longitudinal direction over a curved levitation support, it is heated by a laser beam and cooled by a fluid so that thermal stresses are induced inside the glass ribbon. This causes the glass ribbon to tear in the longitudinal direction, originating from an initial flaw.

WO 2011/026074 A1 describes a method to impose a slit into a glass substrate. In this method, a laser beam is directed onto a flaw and advanced over the glass surface. Moreover, a fluid stream is directed directly onto the laser spot on the glass surface, so that the glass is cooled down, even before the temperature that is produced by the laser beam is completely equalized through the thickness of the glass substrate. The thermal stress is hereby limited to a portion of the thickness of the glass substrate, and the resulting slit propagates only partially through the thickness of the glass substrate.

U.S. Pat. No. 6,327,875 B1 describes a method wherein the glass is also not separated completely, wherein scoring by means of a laser beam is implemented. Separation of the glass then occurs through exertion of a bending moment. It is suggested to use a laser beam having an elongated elliptical beam profile, and to block part of the beam on at least one end.

Problems may arise with thinner glasses, in particular glasses having thicknesses of less than 250 µm, such that these glasses may be warmed up so rapidly (typically within milliseconds) that a sufficiently high temperature gradient cannot be maintained until impingement of the cooling jet. Problems during separating of very thin glasses may then present a partially insufficient process stability and strength of the glass edges produced with the separation process.

What is needed in the art is a laser induced stress crack separation method that improves process stability and thus also the strength and the defined progression of glass edges of very thin glasses.

SUMMARY OF THE INVENTION

The present invention provides a method for separating thin glass with a thickness less than 250 µm, wherein the thin glass is heated with a laser beam along a path forming a parting line, progressing along a forward feed direction, so that based on the thus produced temperature difference of the heated glass relative to the surrounding glass, a mechanical stress is created in the glass and a crack propagates following the mechanical stress along the parting line, separating the thin glass. The laser beam is formed by a beam-forming optic in such a way that the beam profile thereof has an elongated shape and wherein the laser beam is directed onto the surface of the thin glass such that the longitudinal direction thereof is aligned in the feed direction. The elongated shape of the beam profile is asymmetric, such that the intensity progression differs at the ends of the beam profile in such a way that the increase in intensity at the front end crossing the thin glass first is steeper than the drop in intensity at the opposite rear end. The front end, during forward feed that crosses the glass first can be formed by an edge progressing in the transverse direction relative to the feed device so that the intensity during crossing of the beam increases rapidly.

According to another embodiment of the invention, the thin glass is cooled by way of a cooling jet, after having been heated. With the inventive beam profile, crack propagation and thus also separation of the glass can also occur without a cooling jet. This is the case especially with thinner glasses with a thickness of 100 µm or less. But the cooling jet can also be advantageous here, so that contact of the edges is avoided due to contraction. Such contact could result in a reduction of strength.

An appropriate device to implement the method therefore includes
- a laser to irradiate a thin glass with a laser beam that is absorbed by the thin glass, therefore heating the thin glass,
- a beam-forming optic to form the beam profile of the laser beam that is produced by the laser,
- a feed device to move the glass relative to the impingement location of the laser beam along an intended parting line, so that based on the thus produced temperature difference of the glass that is heated along the separating line relative to the surrounding glass, a mechanical stress is produced in the glass and a crack propagates following the mechanical stress along the parting line, separating the thin glass. The beam-forming optic is created to form the laser beam in such a way that its beam profile has an elongated shape and wherein the laser beam is directed onto the surface of the thin glass such, that the longitudinal direction thereof is aligned in the feed direction, and wherein the elongated shape of the beam profile is asymmetric, such that the intensity progression differs at the ends of the beam profile in such a way that the increase in intensity at the front end crossing the thin glass first is steeper than the drop in intensity at the opposite rear end.

A cooling jet generator is provided as an option to produce a cooling jet that impinges onto the thin glass along the parting line, offset to the laser beam, so that during forward feed, a point of the thin glass that is positioned on the parting line first passes through the impingement location of the laser beam and then through the impingement location of the cooling jet.

The flow of the cooling jet may be selected depending on the thickness of the glass. A higher cooling jet flow may be selected in the case of a thinner glass. If therefore, during the process a change is made from a thicker glass to a thinner glass, then the cooling jet is increased, or vice versa. The flow can also be adjusted proportionally to the glass thickness. With a glass thickness for example of 50 μm, a flow that is approximately twice as high as the flow that is especially suitable for a 100 μm glass has proven to be advantageous. Generally, very low flows are already sufficient, whereby for a glass thickness of 100 μm the optimum cooling jet flow is almost at zero. A certain cooling jet flow however can be advantageous. Completely without cooling jet the cutting process can become unstable, or have a poor start and this could result in interruptions in the process, whereby the crack does not propagate further. A flow that is too strong on the other hand, can lead to thermally or mechanically induced wave formation in the glass.

To produce an asymmetrical beam profile, especially one with an edge at the front end, the beam profile can simply be shaded at its front end by way of a suitable shading element. However, a part of the beam energy gets lost initially as a result of such shading.

Another option is to produce the edge through beam formation by way of a diffractive optical element. The entire radiant energy can then be utilized with a suitable diffractive optical element.

Another option is the further development of the aforementioned shading, wherein the shading is accomplished by way of a reflective optical element, wherein the reflective partial beam is directed onto thin glass 1 and the beam profile is created from the reflected partial beam that is radiated past the reflective optical element.

Finally, it is also possible to produce such an asymmetrical beam profile by a cylindrical lens as a component of the beam formation device, that is tilted relative to the beam direction. The optical axis of the cylindrical lens is then not parallel to the beam direction of the laser beam but diagonal, for example at an angle in the range of 25° to 75° relative to the direction of the beam.

It is demonstrated that, with the beam profile as discussed above, very thin glasses having thicknesses of less than 250 μm, even less than 100 μm can be separated reliably and without lateral movement of the edge. Moreover, it has been shown that the thus produced edges may also possess higher strength than edges that were produced with a normal beam profile terminating at both ends. This shows increased strength in regard to the higher median value of the bending stress during a break, as well as in particular at the higher Weibull-module. If the Weibull module is high, a break related to breaking stresses that are not too high can be ruled out or can be considered at least highly improbable. This also allows for glass elements that were cut to size with the inventive method to be subjected to permanent pressure, but to nevertheless achieve a long lifespan for this glass element. Accordingly, a thin glass element having a maximum thickness of 250 μm is provided that can be produced with the inventive method or the inventive device, that has at least one edge that is cut by way of laser stress crack separation, wherein the thin glass element has a Weibull distribution with a Weibull module of at least m=4.5, for example at least m=5, for example m=6 for fractures originating from the edge under bending stress.

As stated before, the median value of the bending stress during the break of the thin glass is generally also higher. Another embodiment of the invention provides that the thin glass element has a Weibull distribution for breaks under bending stress, wherein the median value of the bending stress during the break of the sample is higher than 200 MPa. The previously cited values for the Weibull module and the median value apply to glass that is not pre-tensioned. This non-pre-tensioned glass element can now be used and/or stored with long-term stability in a curved form since due to the high Weibull module a break is highly unlikely. The previously cited Weibull module and median values of the bending stress can be achieved for example with glasses having thicknesses in the range of 30 μm to 150 μm.

It is further demonstrated that the edge strength of the thin glass element also depends on the feed rate. Faster feed rates are herein more favorable for a high edge strength. The speed must however be adequate to sufficiently heat the glass. The laser beam may cross-over the thin glass with a speed of at least 3 meters per minute, for example with a speed in the range of 3 to 20 meters per minute.

One embodiment of a glass element that is constantly under bending stress is a thin glass ribbon wound on a roll. After its production and after trimming of braids off the edges, the thin glass ribbon can be wound onto a roll with the method according to the invention and can be stored in this space-saving manner until further processing. The thin glass ribbon may have a length of at least 10 meters, for example at least 100 meters.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIGS. 2(a)-2(b) illustrate an asymmetrical beam profile according to the invention;

FIG. 3 illustrates a symmetrical beam profile for comparison purposes;

FIG. 19 illustrates a thin glass roll as an application example for thin glasses that are processed according to the invention.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
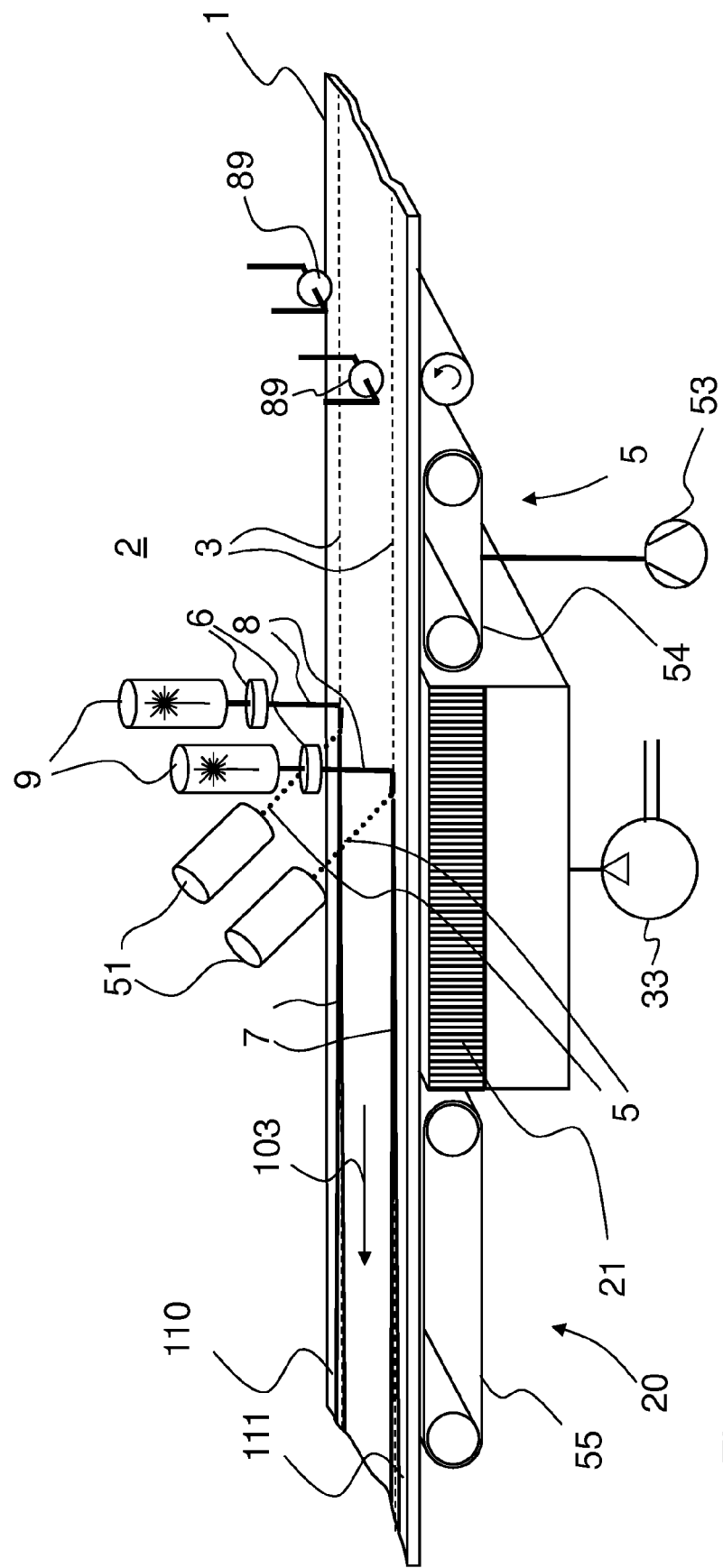
FIG. 1 illustrates a device to implement the method according to the invention.

FIG. 1 illustrates an embodiment of an inventive device 2 for stress crack separation of thin glasses 1. In the present embodiment, device 2 is designed according to an application of the invention for trimming braids 110, 111 from a thin glass 1 that is in the embodiment of a thin glass ribbon.

The method of separating glass that can be implemented with the device 2, in this case specifically separating of braids 110, 112 from a thin glass ribbon is based in that a thin glass a ribbon 1 with a maximum thickness of 250 μm is guided along a longitudinal feed direction 103 by way of a transport device 20 over a levitation support 21. Lasers 9 are provided which direct laser beams 8 onto the thin glass ribbon in the region of levitation support 21 and which heat thin glass 1 locally while the thin glass ribbon passes in longitudinal direction 103. A $CO_2$ laser or a laser beam in a wavelength range that—as is the case with a $CO_2$ laser—is also completely or almost completely absorbed into a surface-near layer. In this way, thin glasses having a thickness of less than 250 μm can also be heated effectively.

Forward feed direction 103 is expediently oriented in longitudinal direction of the thin glass ribbon. A cooling jet 5 is blown onto the heated path by way of a cooling jet generator 51, so that the heated region is cooled off again, and a mechanical stress is produced that leads to propagation of stress crack 7 that separates thin glass 1 in longitudinal direction 103 along the heated path, thereby severing braids 110, 111 along intended parting line 3.

Thin glass 1 is progressively heated in feed direction 103 by way of a laser beam 8 along a path which defines a parting line 3 and is subsequently cooled by way of a cooling jet 5, so that a mechanical stress is produced in the glass due to the created temperature difference and a crack 7 propagates following the mechanical stress along parting line 3, thereby severing thin glass 1.

A gas jet, for example an air jet can be used as the cooling jet. Aerosol jets or moist jets may also be used as cooling jets. A higher cooling performance is achieved through the liquid phase of the aerosol, and the stress gradient is thereby also increased. Moist air may also stabilize the cutting process. This is the case even if no liquid phase is present initially in the air, in other words the air is not present in aerosol form, at least not prior to the gas emission. A relative humidity of the gas that is used for the cooling jet (for example air as the gas) of 70% to 100%, for example greater than 80%, for example greater than 90%. Cooling and condensation and thereby formation of an aerosol can conceivably be achieved through adiabatic relaxation. According to yet another embodiment, a droplet jet with successively abutting droplets or a liquid jet, for example, a water jet can also be used for cooling. A droplet jet can be easily produced by an inkjet printer head. Both, a droplet jet and a liquid jet may offer the advantage that a greater cooling performance can be achieved on a very limited area. In further development of the invention it is generally provided that a cooling jet is used that is a moistened gas jet with a relative humidity of 70% to 100%, or comprises a liquid phase, either in the form of aerosol droplets, in the form of a liquid jet or as a droplet jet with successively abutting droplets. Cooling jet generator 51 then includes a device for production of a moistened gas jet with a relative humidity of 70% to 100%, or the production of a cooling jet with a liquid phase.

According to one embodiment, a cooling jet with a flow of 0.05 liters/hour may be used for separating a thin glass having a glass thickness of 100 μm. With a 50 μm thick glass, a cooling air flow of 0.4 liters/hour may be used.

The cooling jet flow, that is the cooling fluid volume flow can be between 0.001 l/h (liters per hour) and 1.0 l/h.

Without being limited to the embodiments, for glass thicknesses between 75 μm and 400 μm, for example a glass thickness of 100 μm (e.g. 100 μm plus/minus 10 μm) a volume flow of between 0.001 l/h and 0.3 l/h, for example 0.05 l/h (especially plus/minus 0.01 l/h) is may be used. For glass thicknesses between 5 μm and 75 μm, for example a glass thickness of 50 μm (e.g. 100 μm plus/minus 10 μm) a volume flow of between 0.06 l/h and 1.0 l/h, for example 0.4 l/h (especially plus/minus 0.1 l/h) can be used.

The embodiment for separation of thin glass 1 on a levitation support 21 is of course not limited to the illustrated embodiment. In general, and without being limited to the illustrated embodiment, it is provided in accordance with one embodiment that thin glass 1 is supported on a gas cushion that is generated by a levitation support, or is guided over the gas cushion, wherein the impingement locations of laser jet 8 and cooling jet 5 are arranged in the section of thin glass 1 that is supported by the gas cushion. A levitation support, although not mandatory, may be used to separate the glass in accordance with the invention. Another suitable support may also be used instead of a levitation support 21.

To support the creation of a crack at the beginning of the separation process, a flaw or respectively an initial damage is imposed in a further development of the invention by way of a scoring device 89 at the beginning of the thin glass ribbon before impingement of the laser beams. Damage progressing through the region that is heated by laser beams 8 may initiate the stress crack.

After initiation of the stress crack, during crack propagation scoring device may then removed from the surface of thin glass ribbon 1, thereby halting the damage. Appropriate apparatus 2 therefore, for example includes a device to lift off scoring device after initiating of the stress crack during the crack propagation from the surface of thin glass ribbon 1. In contrast to what is provided in US 2013/0126576 A1, scoring occurs only at the beginning. However, it has been shown that crack propagation after initiation can occur simply on the basis of the temperature gradient, due to heating with laser beam 7 and subsequent cooling with the cooling fluid.

The scoring device 89 may be in the form of a scoring wheel, for example a small wheel having a structured scoring surface. FIG. 1 illustrates the thin glass ribbon after having imposed the initial damage in form of an incipient crack. The small scoring wheels are herein accordingly raised and are no longer in contact with the glass surface.

By way of a pressure source, for example a pump 33, compressed fluid, for example air is fed to levitation support 21. The compressed fluid escapes through openings on its surface side that faces thin glass ribbon 1 so that a gas cushion forms between thin glass 1 and the surface of levitation support 21 that carries and supports thin glass 1. Instead of a pump 33 a reservoir with compressed fluid is also conceivable. To provide a uniform pressure, a reservoir and/or a throttle may also be interconnected with pump 33 and levitation support 21. In the area surrounding the cutting process, thin glass 1 is therefore moved suspended by way of gas levitation so that the ambient air acts as a thermal insulator.

In accordance with one embodiment, transport device 20 comprises one or more transport belts 54, 55, as illustrated in FIG. 1. In the example illustrated in FIG. 1, two belts are provided, whereby viewed in direction of conveyance, belt 54 is arranged before levitation support 21, and belt 55 is arranged after levitation support 21. One belt that is arranged in direction of conveyance before levitation support 21 (in the example in FIG. 1 this is belt 54) may feature vacuum suction 53 to firmly hold the thin glass on the belt. This permits exertion of sufficiently high pulling forces without possibly affecting upstream process steps—for example a draw process from a smelt or a pre-form, or unwinding of the glass ribbon from a roll.

Thin glass 1 may be moved quickly past laser jets 8, so that respective laser jet 8 crosses over thin glass 1 at a rate of at least 3 meters per minute, for example at a rate in the range of 3 to 20 meters per minute.

According to the invention, a beam forming optic 6 is provided for respective laser beam 8, with which optic the beam profile is changed in such a way that it has an elongated shape after the beam formation and its longitudinal direction is positioned in feed direction 103. The section in FIG. 2 (a) illustrates such beam profiles 80, together with the feed direction 103 of the glass. The elongated shape of the beam profile is asymmetrical, wherein ends 82, 83 of the beam profile differ from one another, wherein front end 82 that crosses over the glass first during feed motion is formed by an edge 84 that progresses transversely to feed direction 103. Rear end 83 of beam profile 80 moreover has steadily decreasing intensity. The beam profile also tapers toward the rear end. Tapering of beam profile 80 may for example be elliptical or pointed.

For comparison purposes, a symmetrical beam profile such as has been used hitherto is shown in FIG. 3. Beam profile 80 in this example is elliptical. As shown in FIG. 2, a beam profile 80 according to the invention can simply be created from a conventional beam profile in that part of the laser beam is blocked or masked. Accordingly, the edge is produced by shading of beam profile 80 at its front end.

If laser beam 8 with said beam profile 80 now crosses over thin glass 1, a rapid increase in laser intensity and thereby the heat output results at the beginning of the heating phase, caused by the edge. Lasers whose laser beam is already almost completely absorbed into the glass surface may be used. A $CO_2$ laser may be suitable. With this surface-near absorption a temperature difference between the irradiated side of thin glass 1 and the opposite side can now also be produced with the beam profile according to the invention.

In the embodiment that is illustrated in FIG. 2(a), edge 84 is straight. Consistent with a further development of the invention, this edge may also be concave so that the two parts of edge 84 originating from the parting line face each other. This type of beam profile is shown in FIG. 2(b). In this case edge 84 has two sides 841, 842 that are tilted toward each other. Without limitation to the specifically illustrated embodiment, edge 84 is designed as a concave recess in the beam profile, or more specifically—front end 82 has a concave recess 85. This progression of edge 84, or more specifically of the front end of the beam profile may prevent spreading of the propagating crack. Recess 85 centers the crack propagation to the intended progression along the parting line.

Figure 4:
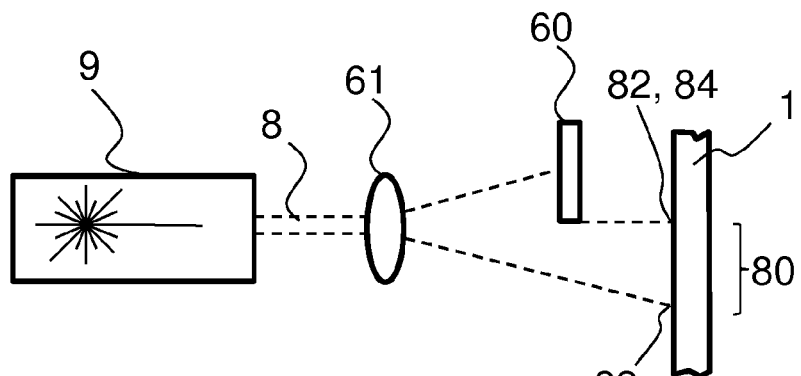
FIG. 4 illustrates an embodiment of a beam forming optic.
Figure 5:
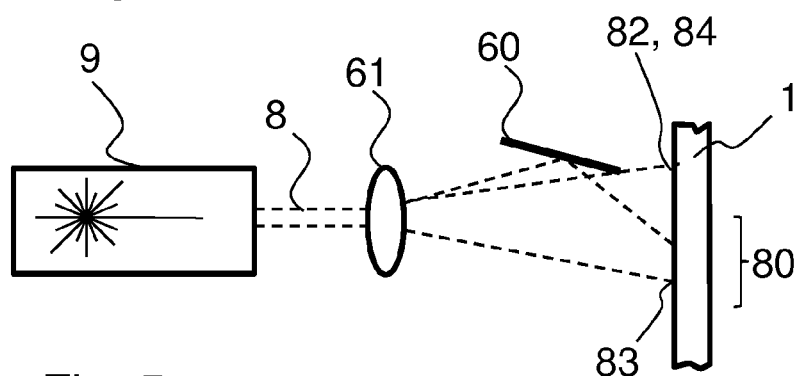
FIG. 5 illustrates an embodiment of a beam forming optic.
Figure 6:
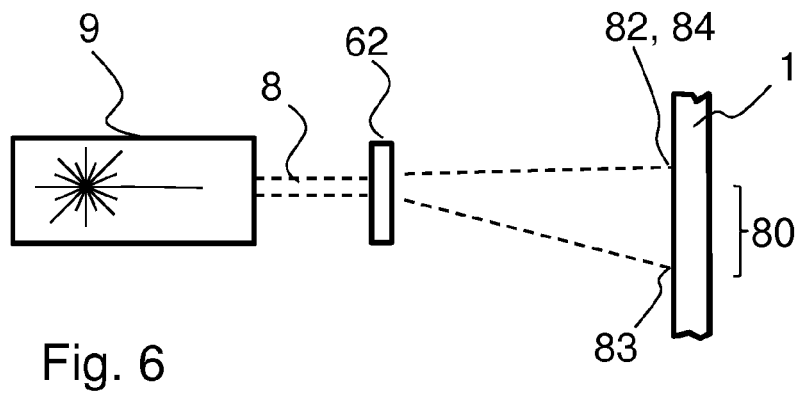
FIG. 6 illustrates an embodiment of a beam forming optic.

FIGS. 4-6 describe various embodiments of beam forming optics 6 that can be used to produce an asymmetric beam profile 80, also according to the embodiments illustrated in FIGS. 2 (a) and (b). According to a first embodiment, the beam forming optic includes a shading element 60 with which a part of the elongated beam profile 80 can be shaded, so that an edge 84 forms in the beam profile on thin glass 1. Prior to shading, an elongated beam profile of laser beam 8 can be produced by way of a cylindrical lens 61.

FIG. 5 shows a variation of the example that is illustrated in FIG. 4. This variation is based in that the shading element 60 is reflective. The blocked partial beam can then be directed onto thin glass 1 through reflection so that it contributes to the intensity distribution of beam profile 80, or respectively so that beam profile 80 is composed on thin glass 1 of the non-shaded partial beam and the shaded reflecting partial beam.

In the embodiment in FIG. 6, a diffractive optical element 62 is used instead of a cylindrical lens 61 and a shading element 60 in order to create asymmetric beam profile 80. The diffractive element is shown as a transmitting element. The element can of course also be reflective for a beam formation.

Figure 7:
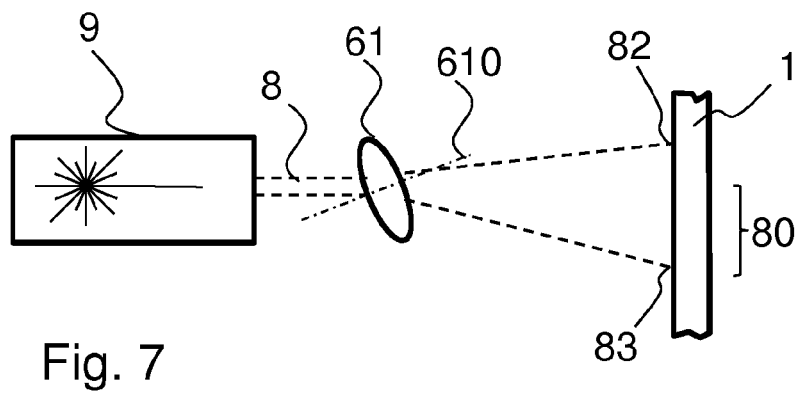
FIG. 7 illustrates an embodiment of a beam forming optic.

FIG. 7 illustrates one embodiment wherein the asymmetric beam profile 80 is produced by way of a cylindrical lens 61, whose optical axis 610 is tilted relative to the beam direction of laser beam 8. The asymmetry of beam profile 80 results herein from the caustic due to the tilting of cylindrical axis 61.

It has been shown that, with the inventive asymmetric design of the beam profile a greater temperature difference can be produced, compared to a symmetrical, for example elliptical profile. This applies especially to thin glasses where a rapid temperature equalization occurs between the irradiated side and the opposite side.

Figure 8:
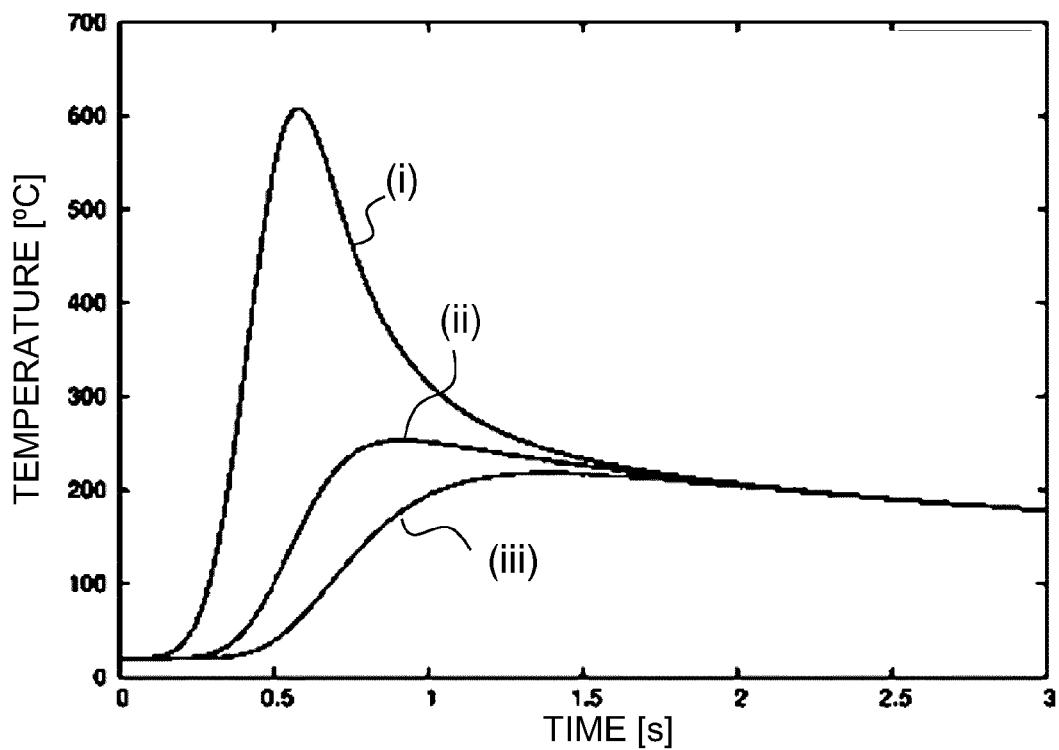
FIGS. 8-10 are diagrams of the temperatures as a function of time on the top and bottom side of glasses of different thicknesses, while crossing over the glass with a laser beam with a symmetrical, elliptical beam profile.
Figure 9:
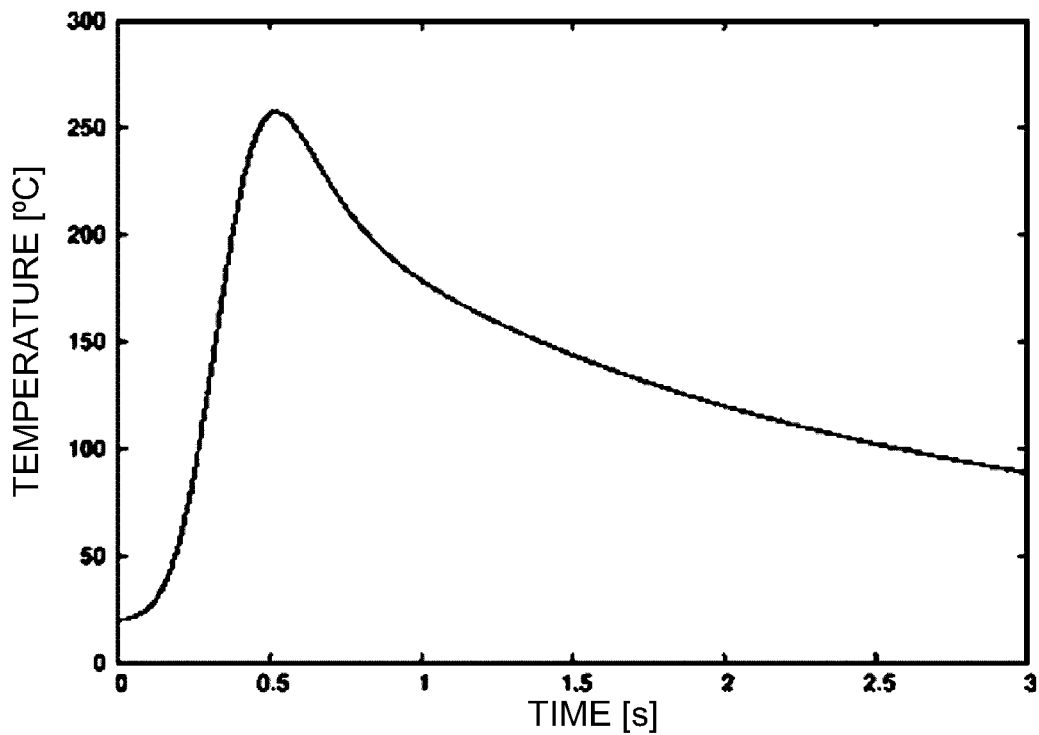
Figure 10:
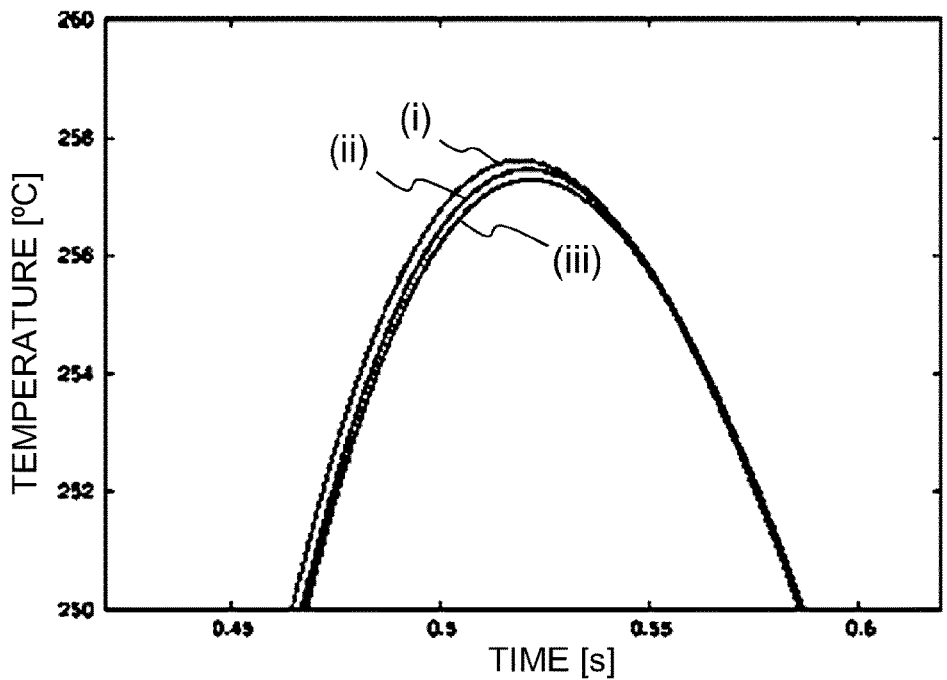

For clarification purposes, FIGS. 8-10 show diagrams of the temperature as a function of time on the top and bottom side of glasses of different thicknesses, while crossing over the glass with a laser beam with symmetrical, elliptical beam profile, according perhaps to a beam profile per FIG. 3.

The temperature progressions for a 1 mm thick glass are illustrated in FIG. 8. Temperature progression (i) is the progression on the irradiated side, temperature progression (ii) is the progression in the center of the glass and temperature progression (iii) is the progression on the opposite side. As can be seen, a considerable temperature difference results between irradiated side and back side. The differences in the mechanical stress are accordingly high, so that crack propagation is reliably forced and the glass can be easily severed.

FIG. 9 shows a relevant diagram on an only 200 µm thick glass. In the illustrated scale, temperature differences between irradiated and opposite side are practically unrecognizable. The curves are overlapping. If—as illustrated in FIG. 10—the section showing the temperature maximum is enlarged, small temperature differences are still recognizable.

The temperature differences dropped however from several hundred degrees Celsius to just a few degrees. The difference of the mechanical stress between irradiated side and the opposite side of the thin glass is accordingly small.

Figure 11:
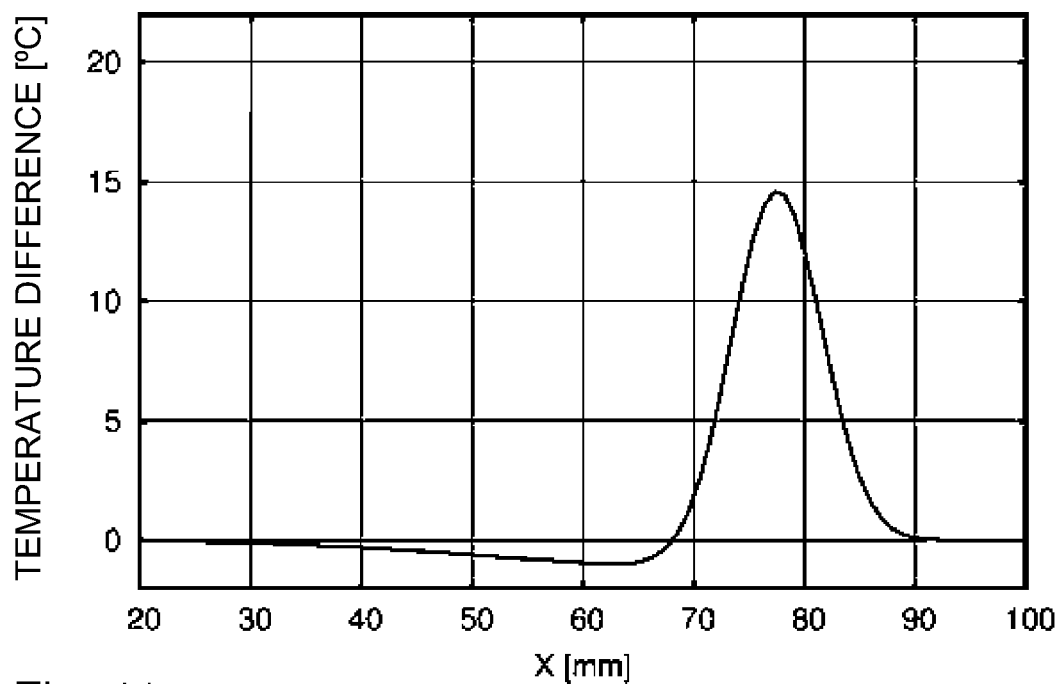
FIG. 11 is a diagram of the local progression of the temperature difference along the parting line with symmetrical beam profile.
Figure 12:
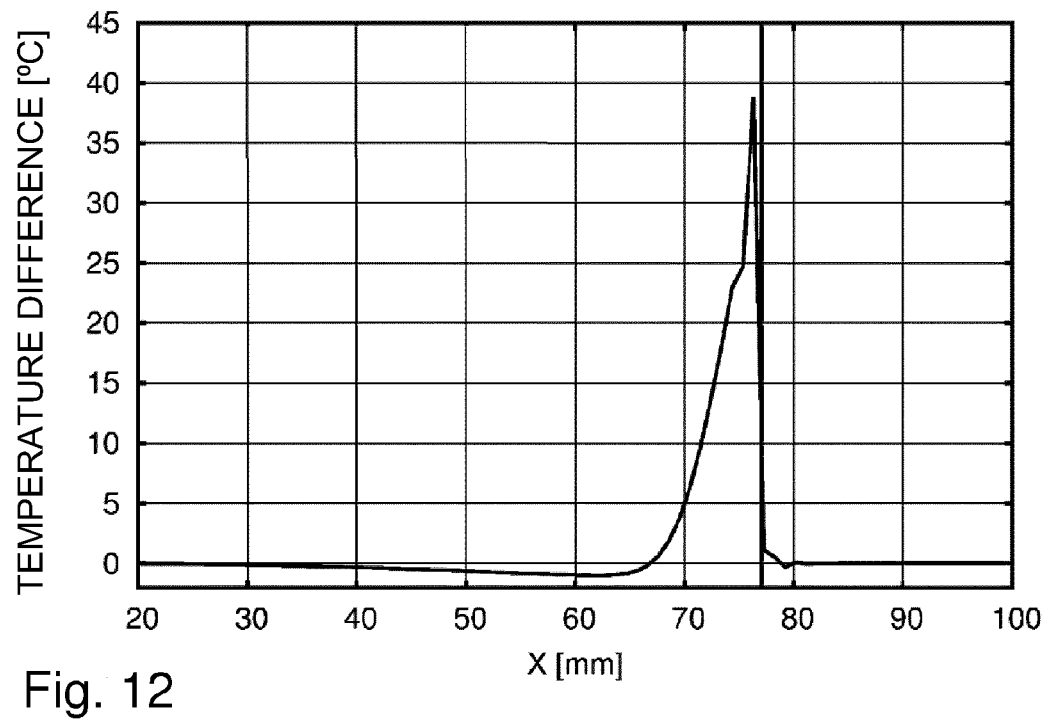
FIG. 12 illustrates the local progression along the parting line with asymmetrical beam profile.

With a beam profile according to the invention, a clearly higher temperature difference can be achieved, as shown in the examples in FIG. 11 and FIG. 12. FIG. 11 is a diagram of the local progression of the temperature difference along the parting line with a symmetrical beam profile. FIG. 12 shows the relevant progression with an asymmetrical beam profile according to the invention. For the asymmetrical beam profile, the same elliptical beam profile was adopted that is also the basis for the progression in FIG. 11, wherein shading occurs starting at the center axis. The asymmetrical beam profile therefore only provides half of the total intensity of the symmetrical beam profile. With more than 35° C. the maximum temperature difference between the irradiated side and the opposite side of the thin glass is nevertheless twice as high than with the symmetrical beam profile. The temperature difference according to FIG. 11 remains at less than 15° C.

Generally, and without limitation to the illustrated design example, cross-over by the inventive asymmetrical beam profile 80 can cause a temperature difference of at least 20° C. between the irradiated side and the opposite side of thin glass 1, as shown also in the example in FIG. 12.

Not only the temperature difference itself is now greater, but also the gradient of the temperature differences. Generally, and without limitation to the illustrated design examples, it is provided according to a further development of the invention that, during cross-over of beam profile 80 a maximum temperature difference between the irradiated side and the opposite side of thin glass 1 is built up within a distance of less than 5 millimeters. In the illustrated embodiment, this distance is even smaller and is in the range of one millimeter. In contrast, with the symmetrical beam profile according to the comparative example in FIG. 11, the temperature difference builds up clearly slower over a distance of approximately 10 millimeters.

Figure 13:
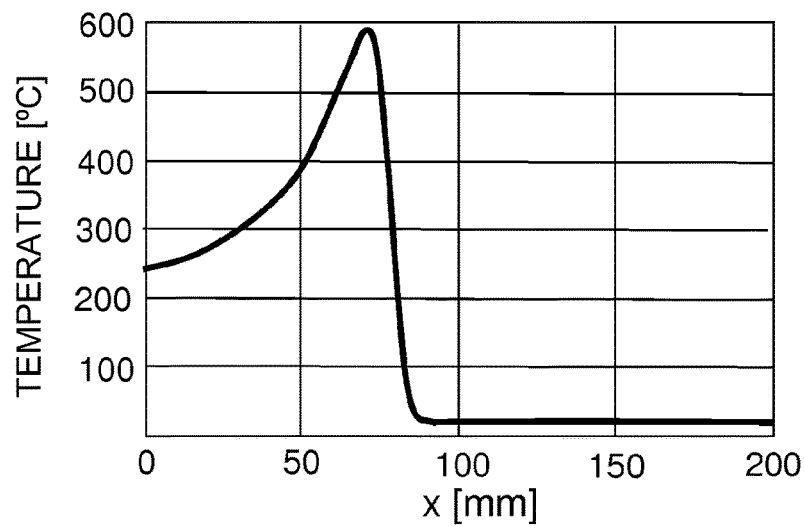
FIG. 13 illustrates the temperature progression of the symmetrical beam profile on the parting line.
Figure 14:
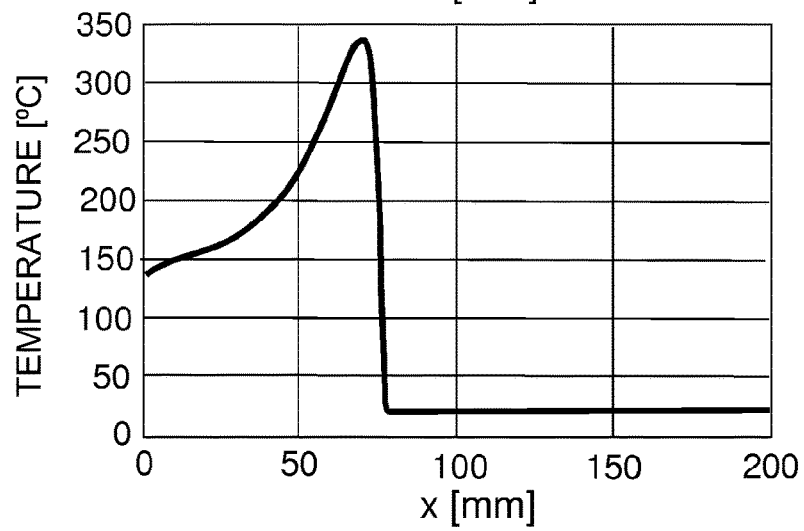
FIG. 14 illustrates the temperature progression of the asymmetrical beam profile on the parting line.

The lower total intensity with the beam profile that is created by partial shading is expressed also in the lower maximum temperature. In this context, FIG. 13 illustrates a temperature progression of the symmetrical and FIG. 14 illustrates the temperature progression of the inventive asymmetrical beam profile on the parting line, wherein half of the elliptical profile is again shaded. Whereas a maximum temperature of approximately 600° C. is reached with the symmetrical beam profile, the peak temperature is only a little less than 350° C. with the asymmetrical profile. Nevertheless, the greater temperature difference that is achieved with the inventively formed laser beam leads to improved process stability.

Figure 15:
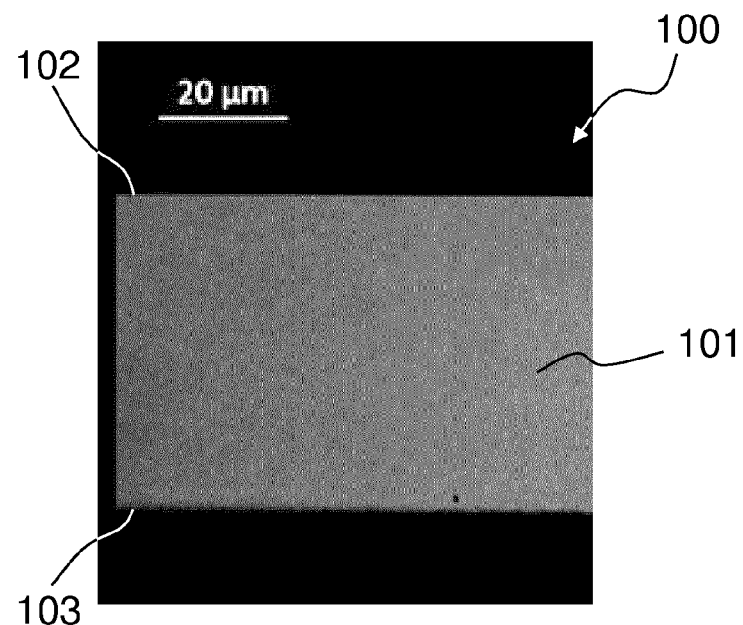
FIG. 15 illustrates a microscopic image of a thin glass element that is produced with the inventive method by way of laser stress crack separation.

FIG. 15 shows a microscopic image of a thin glass element 100 that is cut to size with the inventive method by way of laser stress crack separation.

Figure 16:
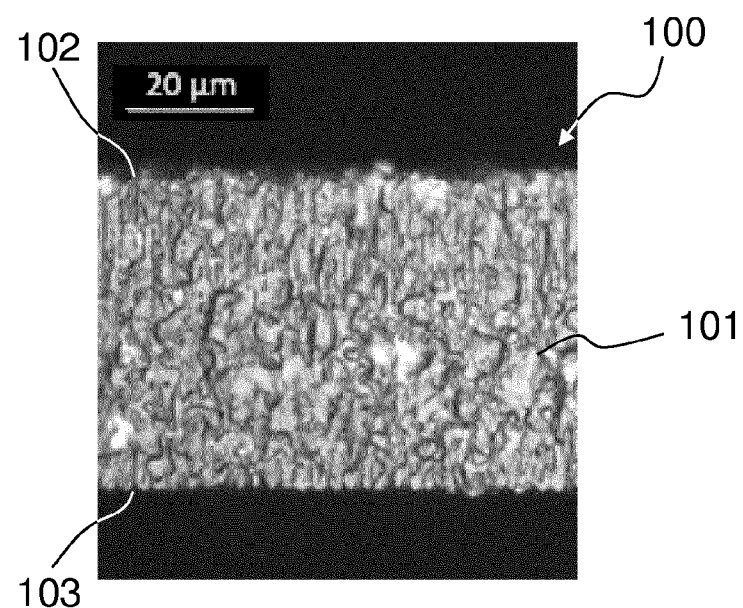
FIG. 16 illustrates for comparison purposes a microscopic image of a thin glass element that was cut by way of laser-filamentation.

For comparison purposes a microscopic image of a thin glass element 100 with side surfaces 102 located opposite one another that was cut by way of laser-filamentation is shown in FIG. 16. The thin glasses in both cases have a thickness of 50 µm. The images were created with a view to edge 101 that is produced with the respective separating process.

A comparison of FIG. 15 and FIG. 16 shows that an edge 101 that is produced with the laser stress crack separation process is easily distinguished from edges that were cut with other methods. Edge 101 that is produced according to the invention is considerably smoother than an edge that is pre-scored with laser filamentation. Damages occur also on an edge that is produced with a conventional score and break method, at least at the transition from edge 101 into either scored side surface 102.

However, an edge produced in general with laser stress crack separation is not necessarily more stable, even though at first glance it appears totally even and free of defects. The edge is generally important for the breaking stability, since breaks originating from the edge are clearly more probable than breaks that originate in a side surface. In the case of a continuous bending load the median breaking strength and also the shape parameter of the Weibull distribution that describes the breaking properties are decisive for stability and in particular also for the life span. If the shape parameter is small, then breaks can also occur with a certain probability at only relatively insignificant stresses, even if the glass has a high median break strength.

It has been shown that with the higher process stability also the strength is increased, especially with a view to the shape parameter. The invention therefore provides a thin glass element 100 with a thickness of 250 µm maximum, for example with a thickness in the range of 30 µm to 150 µm. The thin glass element 100 can be produced with the method or the device according to the invention. The thin glass element 100 has at least one edge 101 that is cut by way of laser-stress crack separation, a wherein—for breaks originating from the edge under bending stress—thin glass element 100 has a Weibull distribution with a Weibull module of at least m=4.5, for example at least m=5.

Figure 17:
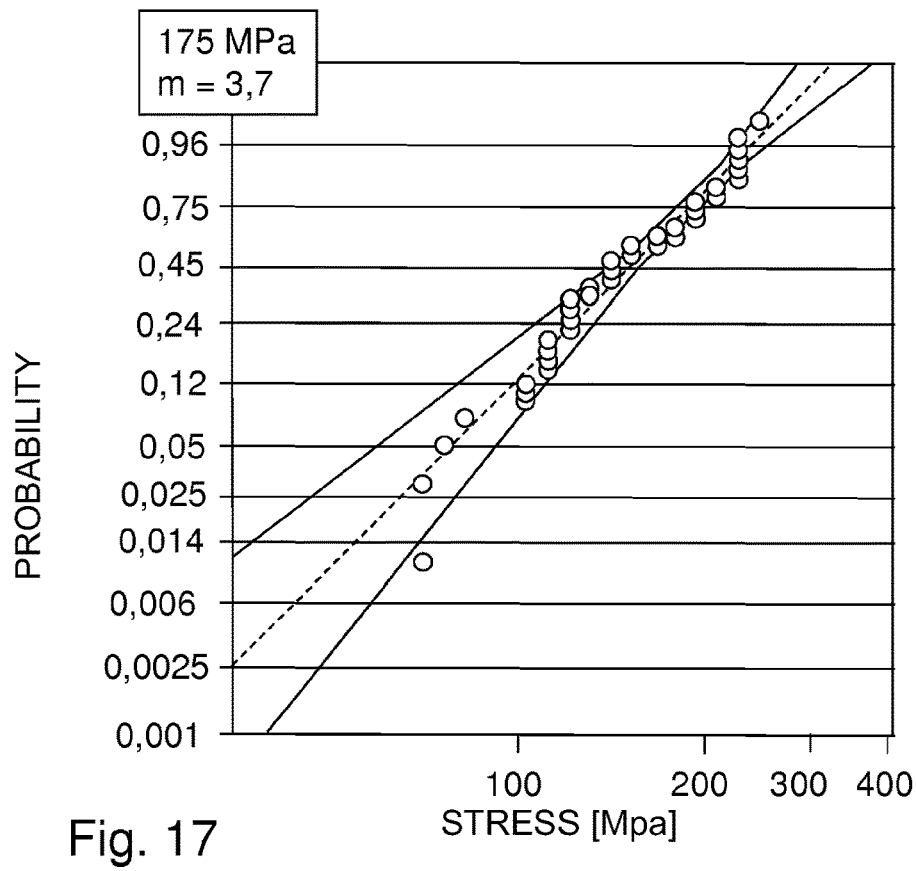
FIGS. 17-18 show Weibull diagrams for breaking strength of thin glass samples.
Figure 18:
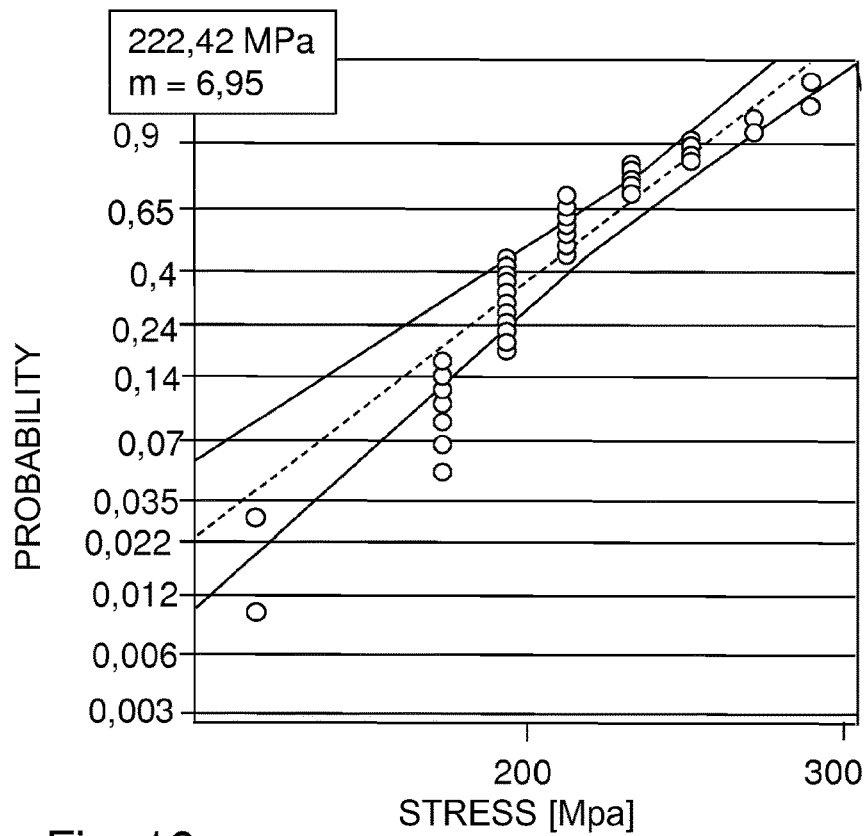

FIG. 17 and FIG. 18 show two Weibull diagrams, in other words double logarithmic diagrams of the probability of fracture as a function of the bending stress of the thin glass samples. FIG. 17 is herein the Weibull diagram of the measured values of the samples that were cut with a symmetrical, elliptical beam profile of the laser beam (similar to the illustration in FIG. 3). FIG. 18 shows the measured values of thin glasses that were separated according to the invention. The scale parameters of the Weibull distribution are also specified in each case according to median breaking stress, as well as shape parameter m. The shape parameter corresponds to the gradient in the Weibull diagram.

On the edge that is produced with the symmetrical beam profile, the median breaking stress is 175 MPa. In comparison, with 222 MPa the median breaking stress for edges produced according to the invention is significantly higher by approximately 27%. Even more clear is the increase of the shape parameter. This increases from a value of 3.7 to a value of 6.95. This is an increase of close to 88%. The strength of the edge is therein also influenced by other parameters such as the feed speed. However, a value of the Weibull module of at least m=4.5 is typically attained with the inventive method.

Also, generally a Weibull distribution if achieved for breaks under bending stress, wherein the median value of the bending stress during breaking of the sample is higher than 200 MPa, as also illustrated in the example in FIG. 18.

With these parameters, it is now possible to subject a thin glass element 100 to higher mechanical stresses while maintaining long-term stability than is possible with glass edges produced by other devices. Because of the great edge strength, a long lifespan is achieved for such a thin glass element under bending stress.

One application example is illustrated in FIG. 19. In this case, thin glass element 100 is wound onto a roll in the form of a thin glass ribbon. The inventively cut and wound edges 101 that—as illustrated in FIG. 1—were produced by separating braids in the hot forming process, represent the front surfaces of the roll. To protect the individual layers of the roll from each other, a web material 11 can be wound simultaneously between the layers.

In this format, the thin glass ribbon can be stored in a space saving manner until further processing. Lengths of at least 10 meters, for example at least 100 meters are conceivable for a thin glass ribbon. The bending stress that is exerted onto the thin glass ribbon is decisively determined by inside diameter 13 of the roll. Because of the high edge stability, the thin glass ribbon can now be wound with a smaller inside diameter 13 but can nevertheless be stored with long-term stability.

For mechanical stress σ, that is caused during separation due to the temperature difference that is produced by the inventive method, the following applies:

$$\sigma = \frac{\alpha E}{1-\mu}\Delta T,$$

σ herein identifies the thermal coefficient of expansion, E the elasticity module and μ the Poisson-ratio of the glass.

Specific characteristic values are listed in the following table for some glasses that are suitable for the invention. Parameter Tg signifies the transformation temperature.

|  | Tg | 20-300 | E |  |
|---|---|---|---|---|
| AF32 eco (8266) | 715° C. | 3.2 ppm/K | 74.8 kN/mm² | 0.238 |
| AF37 (8264) | 711° C. | 3.77 ppm/K | 78. kN/mm² | 0.240 |
| AF45 | 662° C. | 4.50 ppm/K | 66 kN/mm² | 0.235 |
| D263 T eco | 557° C. | 7.2 ppm/K | 72.9 kN/mm² | 0.208 |
| BF33 (MEMpax) | 525° C. | 3.25 ppm/K | 64 kN/mm² | 0.2 |
| B270 | 533° C. | 9.4 ppm/K | 71.5 kN/mm² | 0.219 |
| As87 (8787) | 615° C. | 8.8 ppm/K | 74 kN/mm² | 0.215 |

A suitable group of glasses for the invention are non-alkaline borosilicate glasses. The following composition in weight percent is herein possible:

| Component | Weight % |
|---|---|
| SiO₂ | 58-65 |
| Al₂O₃ | 14-25 |
| B₂O₃ | 6-10.5 |
| MgO | 0-3 |
| CaO | 0-9 |
| BaO | 3-8 |
| ZnO | 0-2 |

These glasses are also described in US 2002/0032117 A1, the content of which in regard to the glass compositions and glass properties in their entirety are considered part of the current invention and are herein incorporated by reference. One glass in this category is the AF32 glass that is already listed in the table.

An additional category of glass types are borosilicate glasses comprising the following components:

| Components | Weight % |
|---|---|
| SiO₂ | 30-85 |
| B₂O₃ | 3-20 |
| Al₂O₃ | 0-15 |
| Na₂O | 3-15 |
| K₂O | 3-15 |
| ZnO | 0-12 |
| TiO₂ | 0.5-10 |
| CaO | 0-0.1 |

One glass in this class of glasses is Schott glass D263 that is already listed in the table. These glasses with more precise compositions are also described in further detail in US 2013/207058 A1, the content of which in regard to the glass compositions and their properties in their entirety are considered part of the current invention and as incorporated herein by reference.

As explained above, extended durability can be achieved for thin glass elements that are cut according to the invention, even if they are subjected to continuous bending stress or generally to superficial tensile stress. To ensure a low break ratio within a long life-span, a thin glass element 100 is provided that, in a further development of the invention is subjected to tensile stress, for example due to a bending stress, wherein the tensile stress is lower than the following term:

$$1.15 \cdot \text{Min}\left(\overline{\sigma}_a - \Delta_a 0.4 \cdot \left(1 - \ln\left(\frac{A_{ref}}{A_{App}}\Phi\right)\right), \overline{\sigma}_e - \Delta_e 0.4 \cdot \left(1 - \ln\left(\frac{L_{ref}}{L_{App}}\Phi\right)\right)\right) \quad (1)$$

wherein $\overline{\sigma}_a$ and $\overline{\sigma}_e$ are median values of the tensile stress during breakage of samples of the glass element, wherein $L_{ref}$ describes the edge length and $A_{ref}$ describes the area of the samples, wherein $\overline{\sigma}_a$ is the median value of the tensile stress during a fracture in the surface of the samples and $\overline{\sigma}_e$ is the median value of the tensile stress during a crack originating from the edge of the sample, produced with the method according to the invention, and wherein $\Delta_e$ and $\Delta_a$ describe the standard deviation of the mean values $\overline{\sigma}_e$ or respectively $\overline{\sigma}_a$, and wherein $A_{app}$ is the area of the thin glass element and $L_{app}$ is the combined edge length of edges of the glass element opposite one another and Φ is the predetermined maximum breakage ratio within a time period of at least half a year.

The maximum predetermined breakage ratio Φ is may be 0.1 or less (10% at most), for example less than 0.05 (less than 5%).

With the further development of the invention a thin glass element 100 is thus produced, that is subjected to a tensile stress $\sigma_{app}$ that is less than the term cited above (1). The tensile stress can for example be caused through winding or through fastening to a support with forced bending.

To achieve a low probability of breakage of the thin glass element within an extended time period, for example up to ten years, the glass element may be subjected to a tensile stress that is less than $$0.93 \cdot \text{Min}\left(\overline{\sigma}_a - \Delta_a 0.4 \cdot \left(1 - \ln\left(\frac{A_{ref}}{A_{app}}\Phi\right)\right), \overline{\sigma}_e - \Delta_e 0.4 \cdot \left(1 - \ln\left(\frac{L_{ref}}{L_{app}}\Phi\right)\right)\right) \quad (2)$$

Already this comparatively small reduction in the maximum tensile strength by a factor of 1.15/0.93=1.236 leads to a considerable increase in the life span of the glass articles subjected to the tensile stress.

With the invention, it is possible to wind thin glass ribbons into rolls 3, that—in regard to their inside radius—are dimensioned in such a way that they survive a predetermined time period, for example an average or maximum storage period with a high probability of zero damage. This applies generally also to other forms of further processing of the thin glass wherein the produced glass is subjected to tensile stress. As in the embodiment of the roll, or respectively with a subsequently processed glass article, the most frequently occurring tensile stresses are caused through bending of the thin glass. Minimum bending radius R hereby has the following correlation with tensile stress $\sigma_{app}$:

$$\sigma_{app} = \frac{E}{1-v^2}\frac{t}{2R} \quad (3)$$

In this correlation, E describes the elasticity module, t the thickness of the thin glass and v the Poisson's ratio of the glass. Possible glass thicknesses are stated in the above description.

For the bending radius that fulfills the condition of a maximum tensile stress $\sigma_{app}$ that was calculated according to term (1), the following relationship results between bending radius and tensile stress through combination with equation (3):

$$R \geq \frac{\frac{E}{1-v^2} \cdot t}{2.3 \cdot \text{Min}\left(\overline{\sigma}_a - \Delta_a 0.4 \cdot \left(1 - \ln\left(\frac{A_{ref}}{A_{app}}\Phi\right)\right), \overline{\sigma}_e - \Delta_e 0.4 \cdot \left(1 - \ln\left(\frac{L_{ref}}{L_{app}}\Phi\right)\right)\right)} \quad (4)$$

From the combination of equation (3) with term (2) for the bending radius with which a low probability of breakage over a longer time period is achieved, the following equation results:

$$R \geq \frac{\frac{E}{1-v^2} \cdot t}{1.86 \cdot \text{Min}\left(\overline{\sigma}_a - \Delta_a 0.4 \cdot \left(1 - \ln\left(\frac{A_{ref}}{A_{app}}\Phi\right)\right), \overline{\sigma}_e - \Delta_e 0.4 \cdot \left(1 - \ln\left(\frac{L_{ref}}{L_{app}}\Phi\right)\right)\right)} \quad (5)$$

For a thin glass element 100 in the embodiment of a thin glass ribbon that is wound onto a roll, as illustrated in FIG. 10, the minimum bending radius R of the thin glass ribbon from which according to correlation (3) the maximum tensile strength $\sigma_{app}$ results, is on inside 17 of the roll. To keep the roll manageable and small, bending radii are preferred where the maximum tensile stress that occurs on the inside on inside diameter 13 amounts to at least 21 MPa.

Edges 101 of the thin glass ribbon that are located on the end faces of the roll were produced by way of separating braids 101, as already described with reference to FIG. 1. The method with which the parameters of the above equations are determined is also described in detail in PCT/EP2014/070826, whose content in its entirety is made object of the current invention and is incorporated herein by reference.

For the embodiments of the invention described above, equations are cited for respectively firmly defined minimum life spans of more than 6 months, or respectively of more than one year. If necessary, another predetermined life span can be specified. Even though minimum radii result from terms (1), (2) it can also be desirable to specify a range of admissible radii with which a certain life span is achieved. If necessary it is moreover difficult to discriminate as to whether during the breakage tests, a break originated from an edge or from within the surface. According to yet another embodiment of the invention it is therefore provided that breakage tests are conducted, whereby the breaking stress or respectively the corresponding bending radii are recorded during the break and that on the basis of this data, statistical parameters are determined and that, on the basis of these parameters a range for a bending radius is determined that guarantees a certain, especially a long lifespan of the glass article that is subjected to mechanical stress.

The invention relates to a thin glass element 100 with edges 101 produced according to the invention by way of laser stress crack separation, for example in the embodiment of a thin glass roll consisting of wound thin glass 1 in form of a thin glass ribbon having a length of for example at least 10 meters, wherein the inside radius of the wound thin glass or more generally, the bending radius of the bent thin glass is in the range of $$R_{min} = \langle R \rangle \cdot \left\{\left[0.7 + \exp\left(\frac{s}{\langle R \rangle \cdot 0.053} - 2.3\right)\right] \cdot (2 - e^{-t})\right\} \text{ to} \quad (8)$$

$$R_{max} = \langle R \rangle \cdot \left\{\left[3.4 + \exp\left(\frac{s}{\langle R \rangle \cdot 0.05} - 2.1\right)\right] \cdot (2 - e^{-t})\right\} w \quad (9)$$

wherein $\langle R \rangle$ is the mean value and $$s = \sqrt{\frac{1}{N-1}\sum R_i^2 - \langle R \rangle^2} \quad (10)$$

is the variance of the bending radii $R_i$ at the breakage of a plurality N of samples of same glass material with same thickness and same glass edges as the glass material of the thin glass element, wherein $R_i$ represents the bending radii at which the samples respectively break, and t represents a predetermined minimum duration in days over which the thin glass element survives without breaking. Such time delayed breaks are herein caused in particular by stress crack corrosion.

An appropriate method to produce a thin glass element 100 in the embodiment of a roll 3 consisting of a wound thin glass 1 having a length of for example at least 10 meters accordingly is based on that, the mean value $\langle R \rangle$ of bending radii $R_i$ as well as the variance s are determined with a breaking test of a plurality N of samples 10 that are subjected to progressively greater bending stress, and that a thin glass ribbon consisting of the same glass material having the same thickness and same glass edges as the glass, material of samples 10 is provided; that at least its longitudinal edges are produced according to the invention by way of laser stress crack separation and that the thin glass ribbon is wound onto a roll. The inside radius of the roll that is the innermost layer of the thin glass ribbon is selected so that it is within the range of $R_{min}$ according to equation (8) to $R_{max}$ according to equation (9), wherein t is a predetermined minimum duration in days over which the thin glass roll is to survive without breaking. In general, certain probability of breaking is however typically present with glass ribbons, even at very high bending radii. However, the parameters of equations (8) and (9) are coordinated so that the breaking ratio is within a predetermined minimum duration, generally less than 0.1, for example less than 0.05.

In this embodiment of the invention the inventive production of edges 101 and their improved strength also influences parameters s and <R>. Due to the increased edge strength, the mean value <R> is increased overall compared to samples with edges that are not cut according to the invention. Depending on the nature of the present defects on edges 101 compared with samples that are not produced according to the invention, variation s can increase or decrease.

To obtain a sufficiently trustworthy statistic for a reliable determination of the bending radius within the range defined by equations (8) and (9), at least twenty, for example at least 50 samples of thin glass are stressed with a bending stress and thus with tensile stress until they break, in order to determine mean value <R> of the bending radii Ri and their variance. The implementation of the method, as well as the determination of the parameters of equations (8) to (10) are described in detail in DE 10 2014 113 149.5, the content of which in this regard in its entirety is considered object of the current invention.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

COMPONENT IDENTIFICATION LISTING

1 Thin glass
2 Device for stress crack separation
3 Parting line
5 Cooling jet
7 Crack
8 Laser beam
9 Laser
11 Web material
20 Feed device
21 Levitation support
33 Pump
51 Cooling jet generator
54, 55 Transport belt
53 Vacuum suction
60 Shading element
61 Cylindrical axis
62 Diffractive optical element
80 Beam profile
82, 83 Ends of 80
84 Edge of 80
89 Scoring device
101 Edge of 100
102 Side surfaces of 100
110, 111 Braids
610 Optical axis of 61

What is claimed is:

1. A method for separating a thin glass with a thickness less than 250 µm, said method comprising the steps of:
    heating the thin glass with a laser beam along a path forming a parting line, progressing along a forward feed direction, so that based on a thus produced temperature difference of a heated glass relative to a surrounding glass, a mechanical stress is created in the thin glass and a crack propagates following the mechanical stress along the parting line, separating the thin glass;
    forming the laser beam by a beam-forming optic in such a way that a beam profile thereof has an elongated shape, said beam profile has a front end and an opposite rear end, and said front end of the beam profile has a concave recess and said opposite rear end is elliptical; and
    directing the laser beam onto a surface of the thin glass such that a longitudinal direction thereof is aligned in the forward feed direction, and wherein the elongated shape of the beam profile is asymmetric, such that an intensity progression differs at said ends of the beam profile in such a way that an increase in intensity at the front end crossing the thin glass first is steeper than a drop in intensity at the opposite rear end.

2. The method according to claim 1, including a further step of cooling the thin glass by way of a cooling jet, after having been heated.

3. The method according to claim 2, wherein said cooling jet is in the form of at least one of a moistened gas jet that has a relative humidity of 70% to 100%, or which comprises a liquid phase, an aerosol jet, a liquid jet, and a droplet jet with successively abutting droplets.

4. The method according to claim 1, wherein said front end of the beam profile that crosses over the thin glass first during a feed motion is formed by an edge that progresses transversely to the forward feed direction.

5. The method according to claim 1, wherein said asymmetrical beam profile is produced by way of at least one of:
    shading of the beam profile at its front end,
    by beam formation by way of a diffractive optical element, and
    a cylindrical lens that is tilted relative to a beam direction of the laser beam, so that an optical axis of the cylindrical lens is positioned diagonally to the beam direction, at an angle in the range of 25° to 75° relative to the direction of the beam.

6. The method according to claim 5, wherein during a cross-over of the beam profile a maximum temperature difference between an irradiated side and an opposite side of the thin glass is built up within a distance of less than 5 millimeters.

7. The method according to claim 6, wherein during cross-over of the beam profile a temperature difference of at least 20° C. between the irradiated side and the opposite side of the thin glass is built up.

8. The method according to claim 1, wherein the laser beam crosses over the thin glass with a speed of at least 3 meters per minute.

9. The method according to claim 1, wherein the laser beam is formed such that the rear end of the beam profile has a steadily decreasing intensity towards the end.

* * * * *